Patented July 21, 1925.

1,546,877

UNITED STATES PATENT OFFICE.

MORRIS L. WEISS, OF NEWARK, NEW JERSEY, ASSIGNOR TO DOVAN CHEMICAL CORPORATION, OF NEW YORK, N. Y., A CORPORATION OF NEW YORK.

RUBBER VULCANIZATION AND PRODUCT THEREOF.

No Drawing.   Application filed February 7, 1925. Serial No. 7,705.

*To all whom it may concern:*

Be it known that I, MORRIS L. WEISS, a citizen of the United States, residing in the city of Newark, county of Essex, State of New Jersey, have invented certain new and useful Improvements in Rubber Vulcanization and Products Thereof, of which the following is a full, clear, concise, and exact description.

This invention relates to a process for vulcanizing rubber and similar vulcanizable materials and to the products obtained thereby, being more particularly directed to the acceleration of vulcanization by a class of organic accelerators.

One of the objects of the invention is to provide a simple, efficient process of vulcanization employing an accelerator which shall be more active and shall produce a higher tensile strength than similarly compounded rubber employing as an accelerator one of the parent substances from which an accelerator of the present invention is derived. By the term "more active", as above employed, I mean an accelerator adapted to function at a lower temperature or in a shorter time, or both.

The invention accordingly comprises a process for vulcanizing rubber which includes vulcanizing the rubber in the presence of the reaction product of a guanidine, preferably disubstituted, and a 1 mercapto-benzo-thiazole. The reaction product mentioned may be represented by the following formula:

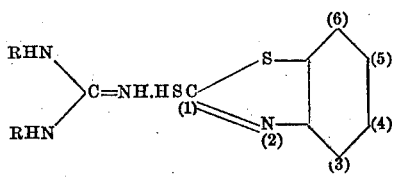

In the formula R may be hydrogen in which case the reaction product would be obtained by use of guanidine unsubstituted, or R may represent radicals such as the aromatic radicals including phenyl, tolyl, xylyl, cumyl and naphthyl or combinations of these radicals such as phenyl-tolyl where one R is phenyl and the other R is tolyl; tolyl-cumyl and so on. Where the phenyl group is used for substituting each R, the reaction product would result from the use of diphenyl guanidine. The positions 3—4—5—6 may be occupied by hydrogen or substituting alkyl radicals.

*Example 1*

One embodiment of the invention is as follows:

100 parts by weight of pale crêpe rubber are combined by milling with 5 parts by weight of zinc oxide, 3.5 parts by weight of sulphur and 1.0 part by weight of the reaction product of diphenyl guanidine with 1 mercapto-benzo-thiazole. The compound is placed in a mold and heated at 20 pounds steam pressure for twenty minutes, at the end of which time a satisfactory vulcanization is effected. The rubber so vulcanized had a tensile strength of 5332 pounds per square inch and an elongation of 800%. The results have been checked by parallel series of tests.

In my Patent No. 1,411,231, I have described the process of vulcanizing rubber in the presence of diphenyl guanidine, and I have tabulated below the tensile strength and elongation obtained by using diphenyl guanidine as an accelerator using the same proportion of this accelerator and other ingredients, as indicated in the example above.

In an article in the Journal of Industrial and Engineering Chemistry, Vol. 15, No. 10, page 1011, Sebrell and Boord describe tests employing 1 mercapto-benzo-thiazole. I have tabulated below the data secured by vulcanization with diphenyl guanidine, 1 mercapto-benzo-thiazole and the reaction product of diphenyl guanidine and 1 mercapto-benzo-thiazole, using the same formula as the above example:—

| Time | 1 mercapto-benzo-thiazole | | | Diphenyl guanidine | | Reaction product of diphenyl guanidine and 1 mercapto-benzo-thiazole | |
|---|---|---|---|---|---|---|---|
| | Steam pressure pounds per square inch | Elongation | Tensile pounds per square inch | Elongation | Tensile pounds per square inch | Elongation | Tensile pounds per square inch |
| | | *Per cent* | | *Per cent* | | *Per cent* | |
| 20 | 20 | 960 | 2,200 | Set cure but too soft to test | | 800 | 5,332 |
| 30 | 20 | 890 | 2,425 | 1,035 | 1,715 | 745 | 5,170 |
| 40 | 20 | 840 | 2,900 | 990 | 2,205 | 715 | 4,625 |
| 5 | 40 | Set cure but too soft to test | | Set cure but too soft to test | | 810 | 5,000 |
| 10 | 40 | 890 | 2,295 | 1,000 | 2,170 | 730 | 4,745 |
| 15 | 40 | 855 | 2,390 | 965 | 2,605 | 680 | 4,260 |

It will be seen from these tests that the tensile strength of the vulcanized rubber compounds obtained by the use of the reaction product of diphenyl guanidine with 1 mercapto-benzo-thiazole are greatly increased. So far as I am aware, the tensile strength, namely, 5332 pounds per square inch, obtained when employing the process given in Example 1 is the highest tensile strength that has been obtained for a soft vulcanized rubber.

It will be observed that the proportions of the ingredients given in the above example may be followed as desired. The following examples represent embodiments of the invention using smaller quantities of sulphur and of the preferred accelerator thus given above:—

*Example 2*

100 parts by weight of pale crêpe rubber are combined by milling with 5 parts by weight of zinc oxide, 3.0 parts by weight of sulphur, 0.5 parts by weight of the reaction product of diphenyl guanidine with 1 mercapto-benzo-thiazole. The compound is placed in a mold and heated for the lengths of time and at the steam pressures indicated in the following table;—the results being as indicated:—

| Time | Steam pressure pounds per square inch | Elongation | Tensile pounds per square inch |
|---|---|---|---|
| 10 | 40 | 865 | 4,015 |
| 15 | 40 | 845 | 4,650 |
| 30 | 40 | 785 | 4,170 |
| 45 | 40 | 780 | 4,195 |

*Example 3*

100 parts by weight of pale crêpe rubber, 5 parts by weight of zinc oxide, 2.0 parts Then by weight of sulphur and 0.5 parts by weight of the reaction product of diphenyl guanidine and 1 mercapto-benzo-thiazole. The compound is placed in a mold and heated for the lengths of time and at the steam pressures indicated in the following table:—

| Time | Steam pressure pounds per square inch | Elongation | Tensile pounds per square inch |
|---|---|---|---|
| 10 | 40 | 880 | 3,820 |
| 15 | 40 | 840 | 4,022 |
| 30 | 40 | 840 | 4,310 |
| 45 | 40 | 845 | 4,215 |

The results of these tests show that over a range of from 10 to 45 minutes at 40 pounds steam pressure per square inch, the elongation and tensile strength are almost constant, giving a very flat curve of cure. With the low quantity of sulphur employed the products resulting do not bloom and in addition they are highly durable. These products are particularly adapted for use in automobile tubes and for similar uses.

The accelerator employed in the examples given is preferably prepared as follows:

1 molecular equivalent of 1 mercapto-benzo-thiazole is dissolved in a water solution of 1 molecular equivalent of caustic soda. To this solution at room temperature is added while stirring a water solution of diphenyl guanidine hydrochloride. A precipitate occurs which is filtered and washed free from salt and dried. The reaction which here occurs appears to be as follows:

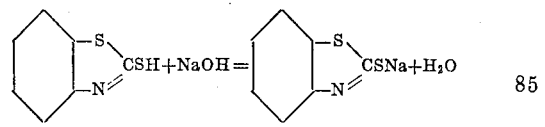

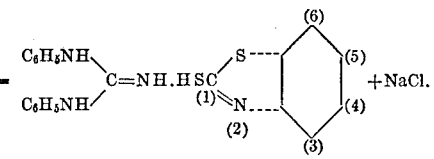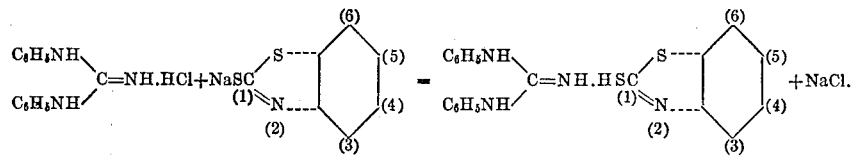

The accelerator may also be prepared by heating together one molecular weight of 1 mercapto-benzo-thiazole and one molecular weight of diphenylguanidine in alcoholic solution and allowing the product to crystallize out, the reaction being:—

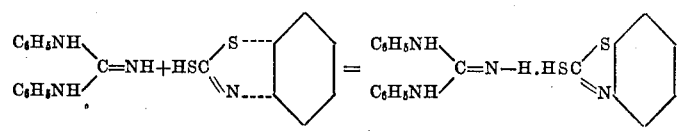

The product obtained by either of the reactions given is a white crystalline material having a definite melting point (about 170° C.). It is non-hygroscopic and non-poisonous. It gives off no poisonous fumes during milling nor does it impart objectionable odor to the finished product. It may be ground to a very fine powder which permits it to be easily compounded with rubber. It is perfectly stable under ordinary conditions. It is practically insoluble in cold water, slightly soluble in hot water, soluble in alcohol and other organic solvents.

It will be understood, as pointed out above, that other materials than diphenyl-guanidine may be employed to react with a 1 mercapto-benzo-thiazole. It will also be understood that hydrogen in the ring in the formula for mercapto-benzo-thiazole may be substituted by various other groups. It has been found that instead of zinc oxide other bivalent metallic compounds may be used, if desired. It will, of course, be obvious that other compounding ingredients may be employed.

Having thus described my invention what I claim and desire to secure by Letters Patent is:

1. A process for accelerating the vulcanization of rubber or similar materials which comprises vulcanizing the rubber in the presence of a reaction product of a guanidine and a 1 mercapto-benzo-thiazole.

2. A process for accelerating the vulcanization of rubber or similar materials which comprises vulcanizing the rubber in the presence of a reaction product of a disubstituted guanidine and a 1 mercapto-benzo-thiazole.

3. A process for accelerating the vulcanization of rubber or similar materials which comprises vulcanizing the rubber in the presence of the reaction product of an aromatic disubstituted guanidine and 1 mercapto-benzo-thiazole.

4. A process for accelerating the vulcanization of rubber or similar materials which comprises vulcanizing the rubber in the presence of the reaction product of diphenyl guanidine and 1 mercapto-benzo-thiazole.

5. A process for accelerating the vulcanization of rubber or similar materials which comprises mixing with the rubber a compound of a bivalent metal, sulphur and a reaction product of guanidine and a 1 mercapto-benzo-thiazole and vulcanizing the rubber.

6. A process for accelerating the vulcanization of rubber or similar materials which comprises mixing with the rubber a compound of zinc, sulphur and the reaction product of diphenyl guanidine and 1 mercapto-benzo-thiazole and vulcanizing the rubber.

7. A process for accelerating the vulcanization of rubber or similar materials which comprises combining approximately 100 parts rubber, approximately 1 or more parts zinc oxide, approximately 2 parts or more of sulphur and approximately 0.5 or more of the reaction product of diphenyl guanidine and 1 mercapto-benzo-thiazole and heating the combination at 20 or more pounds per square inch steam pressure until vulcanized.

8. As an accelerator of vulcanization, a substance having a formula

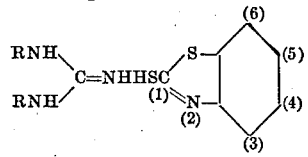

9. As an accelerator of vulcanization, a substance having a formula

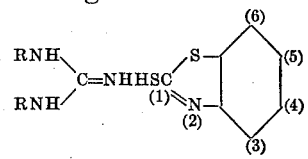

where R is an aromatic radical.

10. As an accelerator of vulcanization, a substance having a formula

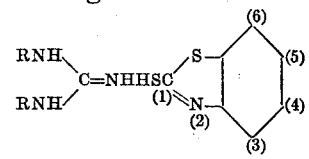

where R is phenyl.

11. A vulcanized rubber derived from rubber combined with a reaction product of diphenyl guanidine and a 1 mercapto-benzo-thiazole.

12. A vulcanized rubber derived from rubber combined with a disubstituted guanidine and a 1 mercapto-benzo-thiazole.

13. A vulcanized rubber derived from rubber combined with the reaction product of diphenyl guanidine and 1 mercapto-benzo-thiazole.

14. A vulcanized rubber derived from rubber combined with a zinc compound, sulphur and the reaction product of an aromatic disubstituted guanidine with 1 mercapto-benzo-thiazole.

15. A vulcanized rubber derived from rubber combined with zinc oxide, sulphur, the reaction product of diphenyl guanidine and 1 mercapto benzo thiazole.

MORRIS L. WEISS.